United States Patent [19]

Sekiguchi

[11] Patent Number: 4,987,534

[45] Date of Patent: Jan. 22, 1991

[54] PROCESSOR HAVING SYNCHRONIZED OPERATION BETWEEN A CPU AND A VECTOR PROCESSOR

[75] Inventor: Sunao Sekiguchi, Tokyo, Japan

[73] Assignee: NEC Corporation, Tokyo, Japan

[21] Appl. No.: 380,733

[22] Filed: Jul. 17, 1989

Related U.S. Application Data

[63] Continuation of Ser. No. 87,299, Aug. 20, 1987, abandoned.

[30] Foreign Application Priority Data

Aug. 20, 1986 [JP] Japan .................... 61-195080
Sep. 19, 1986 [JP] Japan .................... 61-221115

[51] Int. Cl.⁵ .................................. G06F 13/00
[52] U.S. Cl. .......................... 364/200; 364/228.6; 364/232.21; 364/263; 364/270.7
[58] Field of Search ... 364/200 MS File, 900 MS File, 364/132, 133, 136

[56] References Cited

U.S. PATENT DOCUMENTS

| | | | |
|---|---|---|---|
| 3,810,119 | 5/1974 | Zieve et al. | 364/200 |
| 4,293,941 | 10/1981 | Muraoka et al. | 364/200 |
| 4,541,046 | 9/1985 | Nagashima et al. | 364/200 |
| 4,589,067 | 5/1986 | Porter et al. | 364/200 |
| 4,639,886 | 1/1987 | Hashimoto et al. | 364/736 |
| 4,803,620 | 2/1989 | Inagami et al. | 364/200 |

OTHER PUBLICATIONS

Saito, et al., "Development of Large General-Purpose Computing System NEC System 1000", NEC Research & Development, No. 69, pp. 9–13 (Apr. 1983).

Primary Examiner—Eddie P. Chan
Assistant Examiner—Matthew C. Fagan
Attorney, Agent, or Firm—Foley & Lardner, Schwartz, Jeffery, Schwaab, Mack, Blumenthal & Evans

[57] ABSTRACT

A vector processor which maintains synchronization with an associated CPU by limiting the operational instruction proceedings. The vector processor utilizes an instruction register to store instructions from the CPU logical operations circuitry word processing in parallel with the CPU in accordance with instructions from the instruction register and a counter which increases in response to a start instruction from the CPU and decreases in response to the completion of an operation by the logical operation circuitry. A restraining signal is generated in response to a prescribed count of the counter, which delays the execution of the microprogram by the CPU. An indicator device is used for indicating storage of an instruction in the instruction register and a flag device is set in response to a start instruction from the CPU which actuates the indicator means even if no instruction is stored in the instruction register. A decision circuit is utilized to determine in response to a prescribed count of the counter whether or not the execution of the microprogram by the CPU is restrained. If it is determined that the execution is not restrained the decision circuitry actuates the indicator device in response to a start instruction from the CPU without setting the flag device. A start instruction for instructing the start of processing by the logical operation circuitry is generated in response to an indication by the indicator device. A detector circuit is utilized to detect a decrease in the counter and to prevent the execution of a restraining signal.

5 Claims, 8 Drawing Sheets

PROCESSOR HAVING SYNCHRONIZED OPERATION BETWEEN A CPU AND A VECTOR PROCESSOR

This application is a continuation of application Ser. No. 07/087,299, filed Aug. 20, 1987, now abandoned.

BACKGROUND OF THE INVENTION

The present invention relates to a vector processor provided independent of the central processor unit in an information processing system.

A vector processor by the prior art is proposed in Saito et al., "Development of Large General-Purpose Computing System NEC System 1000" in NEC Corporation, NEC RESEARCH & DEVELOPMENT, No. 69, April issue, 1983, pp. 9-13. The integrated array processor (IAP), which is the vector processor in this System 1000, is built into the central processor unit (CPU). This IAP, responding to an operation start instruction and an operand from the CPU, starts an operation. In response to the completion of vector processing by the IAP, the CPU outputs the next operation start instruction. It is difficult, however, for an array processor built into the CPU to perform high-speed processing.

Therefore, it is desirable to provide, independently of the CPU, a vector processor capable of high-speed processing, having a clock cycle equal to an integral multiple of that of the CPU and having an expanded bit width for the processing unit.

In this case, the CPU and the vector processor share the processing functions as follows. The former is responsible for supplying processing instructions and operands to and receiving the results of processing from said vector processor. The latter is responsible for performing processing with the operands and providing the results of processing. For some instructions, the CPU need not receive processing results from the vector processor, such results are used in the vector processor for subsequent processing.

In such a system, in order to enable said CPU and vector processor to operate efficiently and raise the speed of execution, it is also necessary to have the operation by the CPU precede that by the vector processor. For instance in a system in which the CPU is ahead of the vector processor by one operation, the CPU gives an instruction and performs operand loading for the second operation while the vector processor is performing the first. To receive the result of the first operation, the CPU waits for the completion of the vector processor's operation. Having received the result of the first operation by the processor, the CPU gives an instruction and performs operand loading for the third operation. Said processor, since it received the operand for the second operation when it completed the first operation, starts the second operation. When the instruction is such that said CPU need not receive the result of operation, the CPU can have its processing precede that by the vector processor within the limitation of operational precedence.

However, this operational precedence is limited by the CPU's relationship with other hardware. If the processing by the CPU is caused to precede beyond this limitation, the instruction given from the CPU to the vector processor will be lost for a full operation, resulting in the disadvantage that the operation of the CPU and that of the vector processor go out of synchronization and the results of processing become incorrect.

SUMMARY OF THE INVENTION

An object of the present invention, therefore, is to obviate the aforementioned disadvantage and to provide a vector processor capable of quick execution of operations.

According to one aspect of this invention, there is provided a first vector processor which comprises: instruction storage means for storing instructions from a central processing unit (CPU); logical operation means for performing an operation in parallel with the CPU in accordance with an instruction from the instruction storage means; and counter means whose count increases in response to an operation start instruction from said CPU and decreases in response to the completion of an operation by the logical operation means.

According to another aspect of the invention, there is provided a second vector processor which includes, in addition to the first vector processor, execution restraining signal generator means, responsive to a prescribed count of said counter means, for generating a signal for restraining the execution of a microprogram by said CPU.

A third vector processor according to the invention includes, in addition to the second vector processor, indicator means, for indicating storage of an instruction into the instruction storage means, and flag means, which is set in response to the operation start instruction from said CPU for actuating the indicator means even if no instruction is stored into said instruction storage means.

A fourth vector processor according to the invention includes, in addition to the third vector processor, decision means which decides in response to a prescribed count of the counter means whether or not the execution of the microprogram by the CPU is restrained and, if it decides that such execution is not restrained, actuates said indicator means in response to an operation start instruction from said CPU without setting the flag means; and start instruction means responsive to indication by the indicator means for instructing the start of processing by the logical operation means.

According to the invention, there is provided a fifth vector processor which includes, in addition to the third vector processor, detector means for detecting, when the flag means is in a set state and an execution restraining signal has been generated from the execution restraining signal generator means, and when the count of the counter means decreases. Generation from said execution restraining signal generator means is prevented and the indicator means is actuated at the next clock cycle in response to the completion of operation by said logical operation means.

BRIEF DESCRIPTION OF THE DRAWINGS

The above and other objects, advantages and features of the present invention will become more apparent from the detailed description hereunder when taken in conjunction with the accompanying drawings, in which.

In the drawings, the same reference numerals denote the same structural elements respectively.

DETAILED DESCRIPTION OF THE PREFERRED EMBODIMENTS

Figure 1:
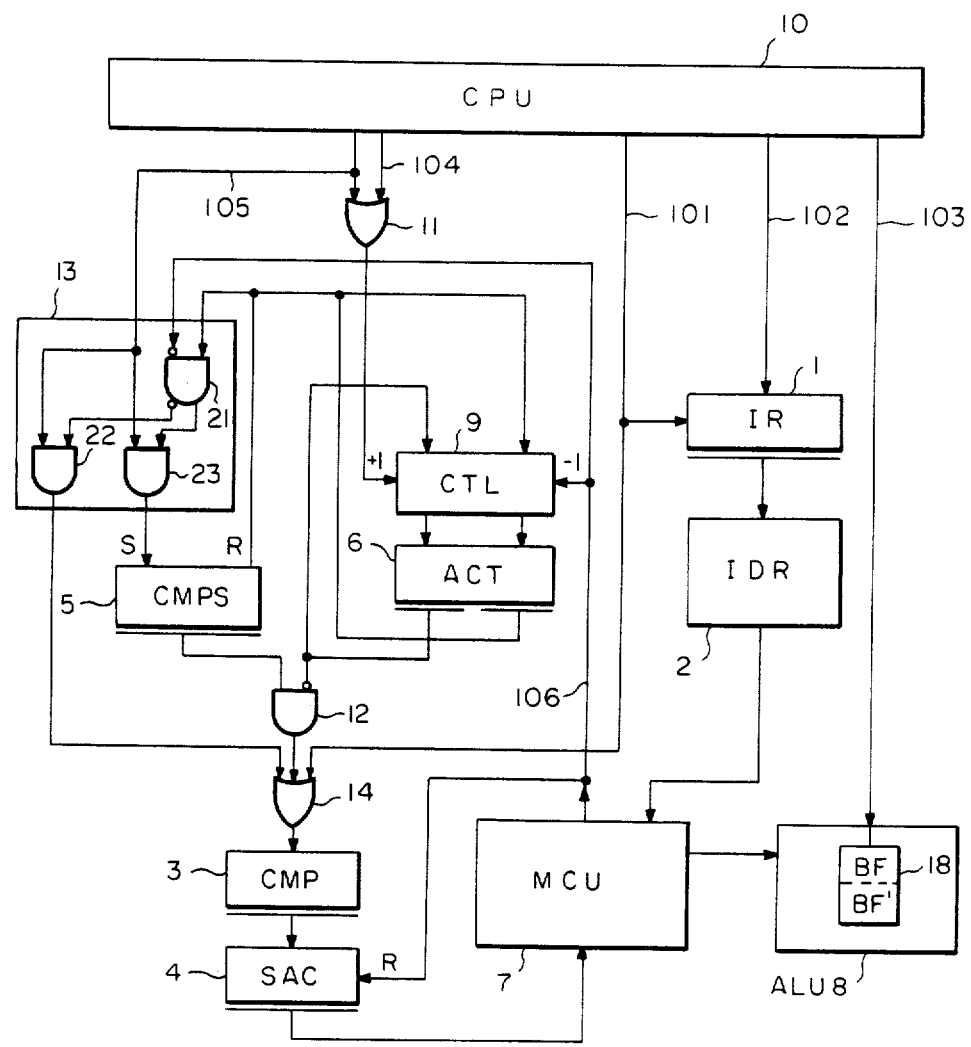
FIG. 1 illustrates a first preferred embodiment of the invention.

Referring to FIG. 1, a preferred embodiment of the invention is a vector processor whose operation is controlled by a central processor unit (CPU) 10 and which executes vector instructions at high speed, several times faster than machine clock cycles in the CPU 10, on behalf of and independent of the CPU 10, and is an additional mechanism to the CPU 10.

This vector processor is provided with an instruction register (IR) 1 for storing software instruction codes; an instruction analyzing random access memory (IDR) 2 for analyzing an instruction code from the IR 1; a CMP flip-flop (CMP F/F) 3 for indicating the loading of the IR 1 with a software instruction or, even if the IR 1 is not loaded, the virtual loading of the IR 1 with a supposed software instruction; a SAC flip-flop (SAC F/F) 4 which is set in response to the output of the CMP F/F 3 and which demands the start of operation by the vector processor; a CMPS flip-flop (CMPS F/F) 5 which is set in response to an operation instruction signal 105 from the CPU to instruct the setting of the CMP F/F 3 without loading the IR 1 with a software instruction and which varies the value in response to a clock signal (not shown) from the CPU 10; a microprogram control unit (MCU) 7 responsive to the output of the SAC F/F 4 for reading and deciphering a microinstruction, using the output of the IDR 2 as the address; and an arithmetic and logical unit (ALU) 8 responsive to a control signal from the MCU 7 for the execution of vector processing.

Figure 2:
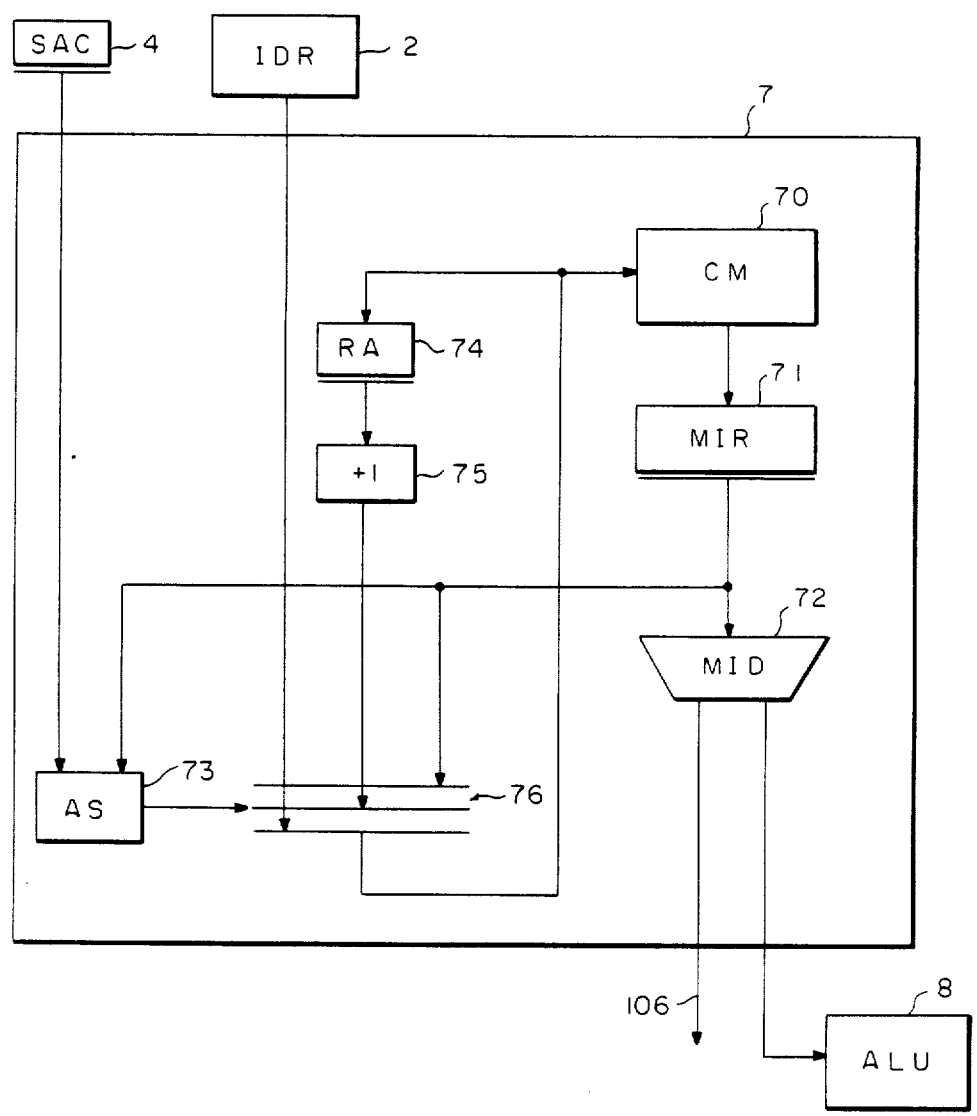
FIG. 2 illustrates the detailed structure of a microprogram control section in the first through third embodiments of the invention.

Referring now to FIG. 2, the MCU 7 comprises a control memory (CM) 70 for storing a microprogram for controlling the vector processor; a microinstruction register (MIR) 71 for storing a microinstruction read out of the control memory 70; a microinstruction decoder (MID) 72 for deciphering a microinstruction from the microinstruction register 71, supplying a control signal to the ALU 8 and, at the same time, for sending out a signal 106 indicating the completion of an operation in the vector processor; an address selection instruction signal generator circuit (AS) 73 for outputting an address selection instruction signal on the basis of the microinstruction from the microinstruction register 71 and the output of the SAC F/F 4; an address register (RA) 74 for storing address information of the control memory 70; an incrementer 75 for increasing the address information of the address register 74 by "+1"; and a selector 76 for selecting one of the addresses from the IDR 2, the incrementer 75 and the address register 74 in accordance with the instruction signal from the address selection instruction signal generator circuit 73.

Figure 3:
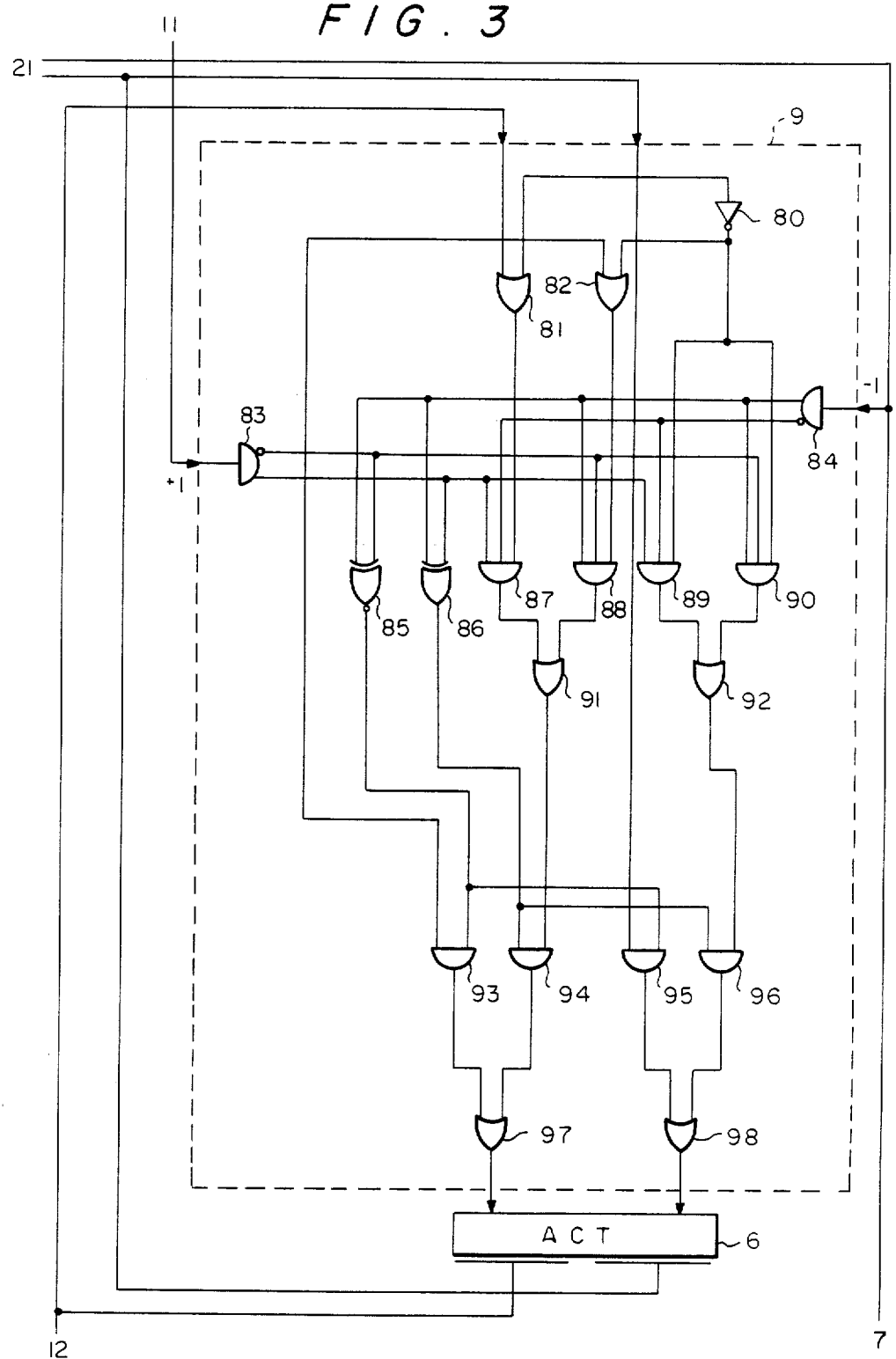
FIG. 3 illustrates the detailed structure of a controller 9 and its relationship to an ACT 6 in the first through third embodiments of the invention.

Referring to FIGS. 1 and 3 together, a controller (CTL) 9 consists of an inverter 80, OR gates 81, 82, 91, 92, 97 and 98, gates 83 and 84, an exclusive-NOR circuit 85, an exclusive-OR circuit 86, and AND gates 87 to 90 and 93 to 96.

This controller 9 controls the contents of the counter register (ACT) 6 so as to increase the count of the ACT 6 by "1" in response to the vector operation start instruction signal 105 provided by the CPU 10 by way of an OR gate 11 and to decrease it by "1" in response to said operation completion signal 106. Accordingly, controller 9 and ACT 6 enable the CPU 10 to leave the execution of the operation to the vector processor and to execute the processing of the earlier software instruction.

Yet, there is a limit to the extent of precedence, and in this particular embodiment, the ACT 6 has a two-bit composition to permit precedence by one operation.

An instruction load signal 101 from the CPU 10 causes the IR 1 to be loaded with an instruction code 102 and the CMP F/F 3 to be set. In response to this setting of the CMP F/F 3, the SAC F/F 4 is set, and the start of operation by the vector processor is demanded. If the previous operation is still being executed at this time, the SAC F/F 4 will be held. In response to the completion of the previous operation, the SAC F/F 4 is reset to start the next operation. Then, even if the count of the ACT 6 becomes "2", the load signal 101 from the CPU 10 will set the CMP F/F 3 and the SAC F/F 4. In this case, there would emerge the inconvenience that this setting invited the disappearance of the operation start instruction signal 105 issued in response to the count "1" of the ACT 6. Therefore to eliminate this situation, if the count of the ACT 6 becomes "2", the execution by the CPU 10 will have to be restrained to prevent the setting of the CMP F/F 3. For this reason, an AND gate 12 detects the count "2" of the ACT 6, and prevents the outputting of the CMPS F/F 5 and the setting of the CMP F/F 3.

A decision circuit 13 is utilized for deciding whether or not the count of the ACT 6 will become "2" in the next cycle. In a configuration where this decision circuit 13 did not exist and the vector operation start instruction signal 105 were directly supplied to a set terminal S of the CMPS F/F 5, the processes to the demanding of the start of the vector processor's operation by the setting of the SAC F/F 4 would still be the same as described above. When vector processing is repeated, as the instruction code remains the same, the CMPS F/F 5 is set in response to the vector operation start instruction signal 105 without successive loading of the instruction code into the IR 1. Simultaneously with the setting of the CMPS F/F 5, the count of the ACT 6, which indicates the extent of precedence of instruction processing by the CPU 10, would be increased by "+1". However, because the operation by the vector processor is completed on the other hand, the operation completion signal 106 is supplied from the MCU 7 to the ACT 6, subtraction by "−1" is instructed, and the count of the ACT 6 remains "0". In response to the setting of the CMP F/F 3, the SAC F/F 4 is set to execute the next vector operation.

In response to the vector operation instruction signal 105 from the CPU 10, the CMPS F/F 5 is set, and the count of the ACT 6 is increased by "+1". When the count of the ACT 6 becomes "2", the CPU 10 can advance no further, so that its execution of the microinstruction is restrained. In the meantime, responding to the completion of the previous operation by the vector processor, the count of the ACT 6 is decreased. In response to this decrease, the CPU 10 resumes its execution of the microinstruction, and the setting of the CMPS F/F 5 causes the CMP F/F 3 to be set. Responding to this setting, the vector processor starts its next operation.

Such a processor having no decision circuit 13, in which the CMPS F/F 5 is set in response to the operation start instruction signal 105 from the CPU 10 irrespective of the count of the ACT 6 would have the following disadvantage. The count of the ACT 6, when it is "0", can become "1" but not "2" in response to the generation of the next vector operation instruction signal. As a result, though the vector processor could immediately start the next vector operation without restraining the execution of the next instruction by the CPU 10, the CMP F/F 3 is set only after the CMPS F/F 5 is set. As a result, the period of time during which the CMPS F/F 5 is in a set state is wasted.

The decision circuit 13, provided to do away with this waste of time, decides whether or not the count of the ACT 6 will become "2" in the next clock cycle, i.e. whether or not the execution of the microinstruction of the CPU 10 will be restrained or not. This decision circuit 13 consists of AND gates 21 to 23. One input to the AND gate 21 is a signal indicating the count "1" of the ACT 6 and the other, a negation signal to the operation completion signal 106 from the MCU 7. The positive and negative outputs of the AND gate 21 are one input to each of the AND gates 22 and 23, and exercise on-off control over the vector operation start instruction signal 105, which is the input to the other input of each of the AND gates 22 and 23. Thus when the count of the ACT 6 is "0", the output of the AND gate 22 is on, and that of the AND gate 23 is off. At this time, therefore, the vector operation start instruction signal 105 is supplied to the CMP F/F 3 via the AND gate 22 and an OR gate 14 to set the CMP F/F 3. When the count of the ACT 6 is "1" and the execution of the microinstruction by the CPU 10 in the next clock cycle may be restrained, the gate 22 is turned off, and the gate 23 is turned on. At this time, therefore, the CMPS F/F 5 is set and, in response to this setting, the CMP F/F 3 is set.

Now it will be explained, with reference to FIG. 4, how the start of vector operation can be advanced by this decision circuit 13.

Figure 4:
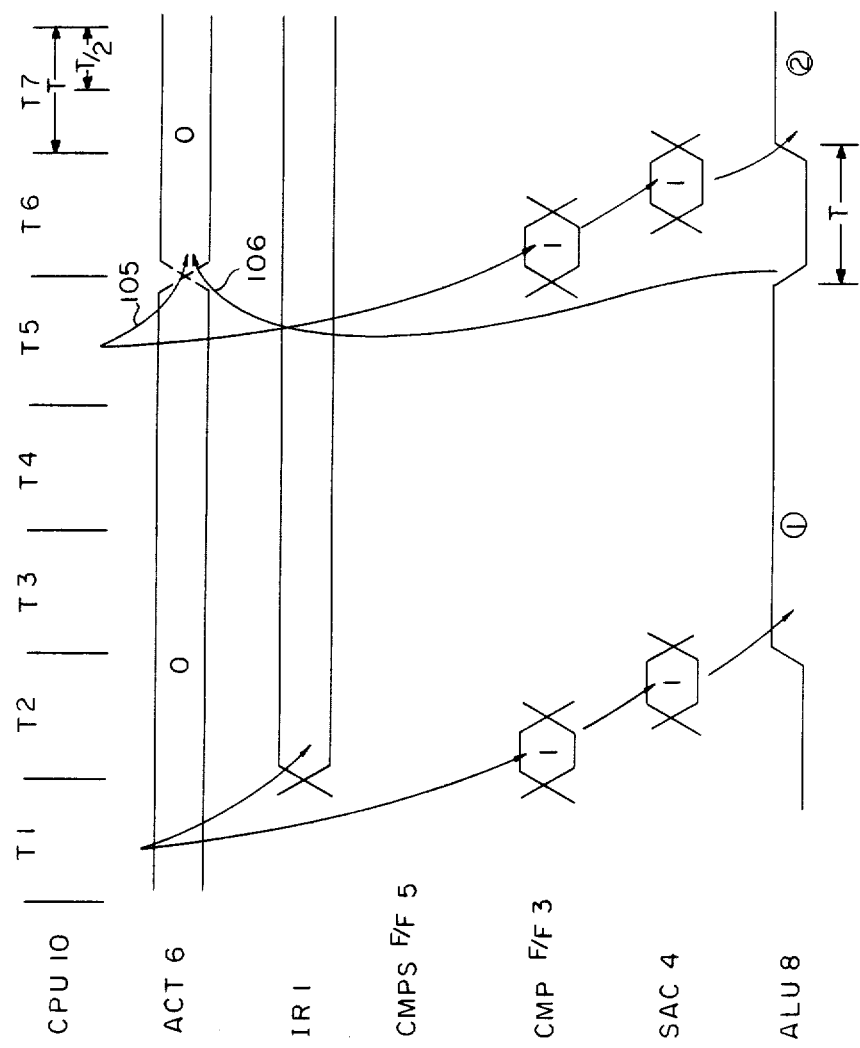
FIG. 4 is a diagram for describing the operation of the first embodiment of the invention.

Referring to FIGS. 1 and 4 together, the vector processor operates with clocks whose period is ½ of the period T of the CPU 10.

First, in accordance with the instruction load signal 101 from the CPU 10, the instruction code 102 is loaded into the IR 1 at timing T2 and, at the same time, the CMP F/F 3 is set to let the vector processor start operating. Then an operand 103 for use in this operation is supplied from the CPU 10 to the ALU 8. Since, at this time, the CPU 10 and the vector processor are executing the same instruction, the count of the ACT 6 is "0". As soon as the CPU 10 completes giving an instruction concerning this operation to the vector processor, it moves ahead to the execution of the next operation.

In a vector instruction, the next operation is assigned the same instruction code, so that no instruction is loaded for the vector processor, and instead the increase of the count of the ACT 6 and the outputting of the operation start instruction signal 105 take place at timing T5. Also at this timing T5, upon completion of the first operation 1 by the vector processor, the operation completion signal 106, together with the ACT 6 advance signal 105, is fed to the controller 9 via the OR gate 11. Accordingly, the count of the ACT 6 remains at "0", and does not change to "1", as determined by the decision circuit 13. Accordingly the CMPS F/F 5 is not set, but the CMP F/F 3 is directly set. In response to this setting, the SAC F/F 4 is set to start the operation by the vector processor. As a result, except when the count of the ACT 6 rises to "2" in the next clock cycle and the instruction execution by the CPU 10 is restrained, the CMP F/F 3 is directly set without setting the CMPS F/F 5, so that the time T during which the CMPS F/F 5 is in a set state can be saved, and the start of vector operation can be advanced correspondingly.

Referring again to FIG. 1, the decision circuit 13 sets the CMPS F/F 5 when the count of the ACT 6 becomes "2", or sets the CMP F/F 3 when it does not.

A register file 18 comprises two buffer registers BF and BF' for receiving the operand 103 from the CPU 10. As it has these two buffer registers BF and BF', it can receive in advance, after receiving a demand to start the next operation, the data for the next operation.

Figure 5:
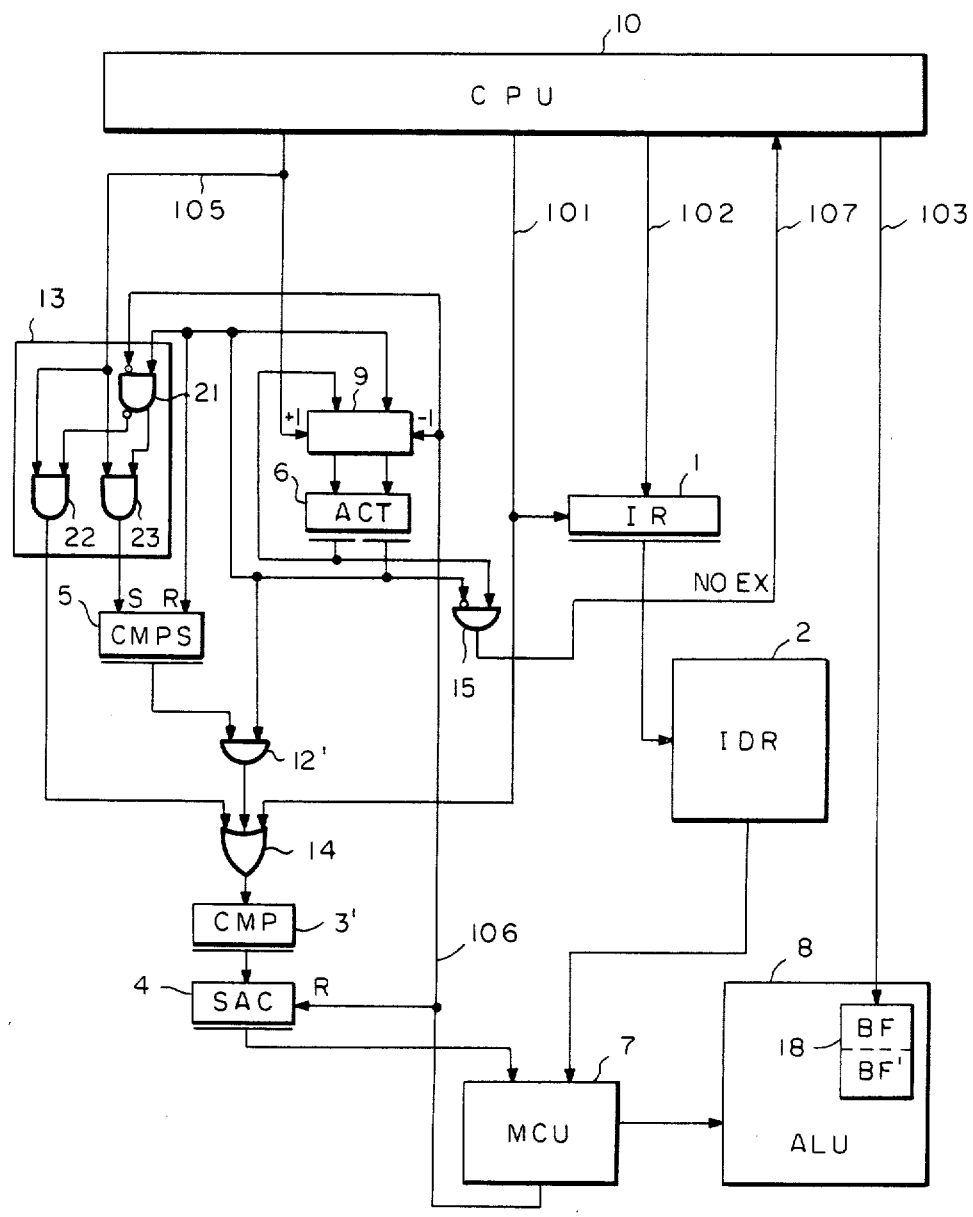
FIG. 5 illustrates a second embodiment of the invention.

Referring now to FIG. 5, a second preferred embodiment of the present invention is based on the first embodiment, to which is added an AND gate 15 for generating an execution restraining signal NOEX 107 for the CPU 10. Thus, because the ACT 6 has a two-bit construction, this signal 107 restrains the execution of the microinstruction by the CPU 10 when the count of the ACT 6 becomes "2".

The operation to use the CMPS F/F 5 in this second embodiment will be described in detail below with reference to FIGS. 5 and 6 together.

The relationship between the operational periods of the vector processor and the CPU 10 in this second preferred embodiment is the same as that in the first embodiment, illustrated in FIG. 4.

Figure 6:
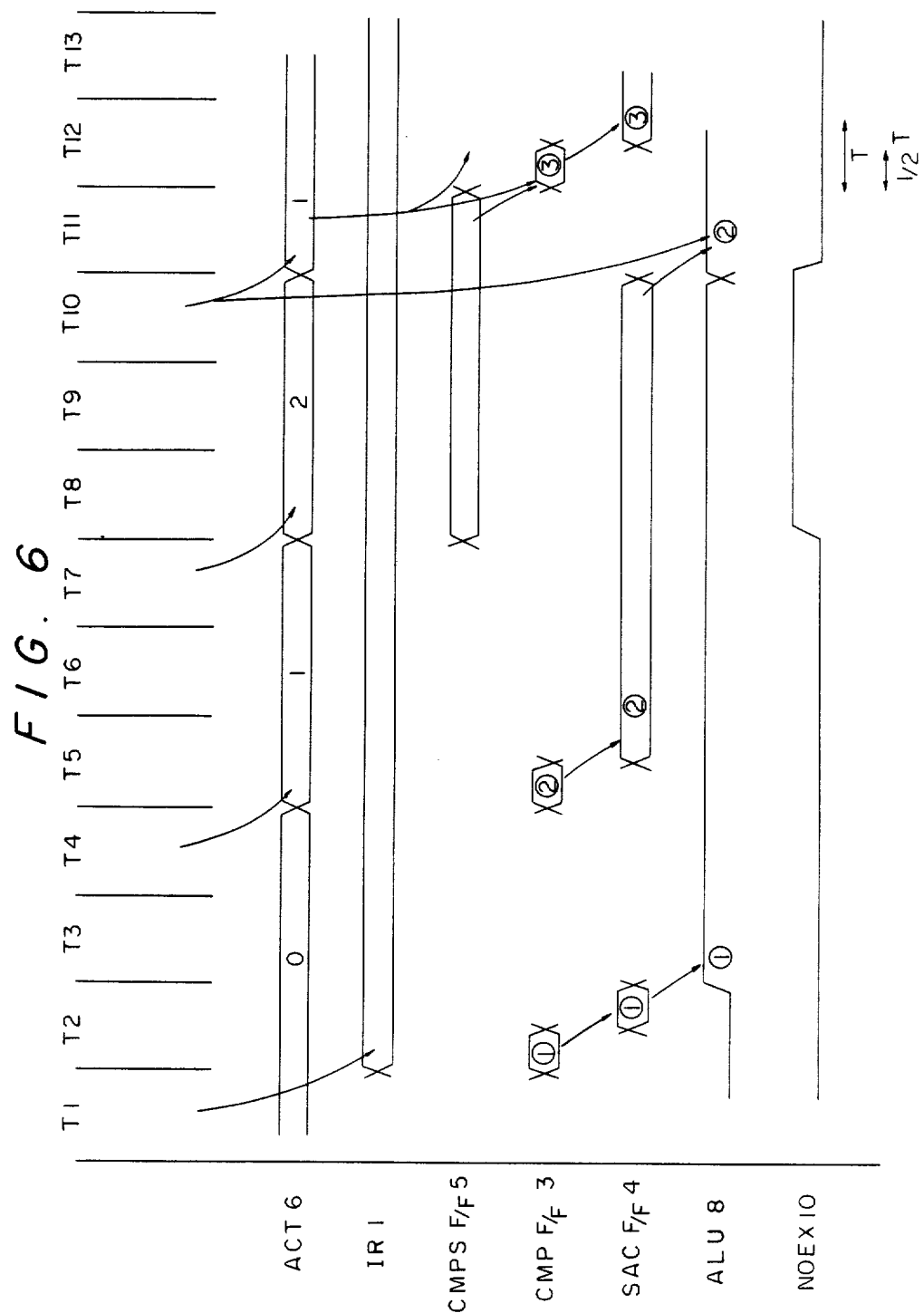
FIG. 6 is a diagram for describing the operation of the second embodiment of the invention.

Referring to FIGS. 5 and 6, in response to the instruction load signal 101 from the CPU 10, the instruction code for vector operation is loaded into the IR 1 at timing T2. At the same time, the CMP F/F 3 is set to indicate the loading of the instruction. In response to this setting, the SAC F/F 4 is set to demand the start of operation by the vector processor. Along with that, the first operation 1 is started at timing T3 on the basis of the operand 103 fed to the ALU 8.

The second operation 2 is processed as follows. First, responding to the vector operation start instruction signal 105 generated by the microinstruction of the CPU 10, the count of the ACT 6, which indicates the extent of the precedence of processing by the CPU 10, is increased by "+1". At the same time, the CMP F/F 3 is set and, in response to this setting, the SAC F/F 4 is set at timing T5. Since, however, the first operation 1 is not yet complete at timing T5, the SAC F/F 4 maintains in its set state until timing T10 at which the first operation 1 is completed.

The third operation 3 is processed as follows. Like in the second operation 2, the vector operation start instruction signal 105 is generated from the CPU 10 at timing T7. Since, however, the first operation 1 is not yet complete, the count of the ACT 6 is increased by "1" to become "2". At the same time the CMPS F/F 5 is set indicating the start instruction from the CPU 10.

The CMPS F/F 5 is a flip-flop giving priority to setting. Here, in response to the count "2" of the ACT 6, the execution restraining signal 107 for the microinstruction is supplied from the AND gate 15 to the CPU 10.

At timing 10, in response to the completion of the first operation 1, the operation completion signal 106 is supplied from the MCU 7 to the controller 9, and the count of the ACT 6 changes to "1". Responding to the setting of the CMPS F/F 5, the CMP F/F 3 is set. In response to the count "1" of the ACT 6, the microinstruction execution restraining signal NOEX 107 to the CPU 10 is cancelled to resume the execution of the microprogram.

In this second preferred embodiment, when processing is to start from a state in which the microinstruction execution restraining signal NOEX 107 has been given to the CPU 10 in response to the count of the ACT 6 and the CMPS F/F 5 is already set, the CMP F/F 3 is set in response to a decrease in the count of the ACT 6 upon completion of the operation by the vector processor. From the completion of the first operation 1 until the setting of the CMP F/F 3 for the third 3, one cycle of the CPU 10 is left idle. It would be better for the CPU 10 to be loaded, after the generation of the operation start instruction signal 105, with an operand for that operation. However, in order that the vector processor can receive this operation start instruction, or the CMP F/F 3 be set, the CPU 10 requires a full cycle, so it does not immediately provide an operand.

Next will be described in detail a third preferred embodiment of the present invention, which does not have this disadvantage, with reference to FIGS. 7 and 8.

Figure 7:
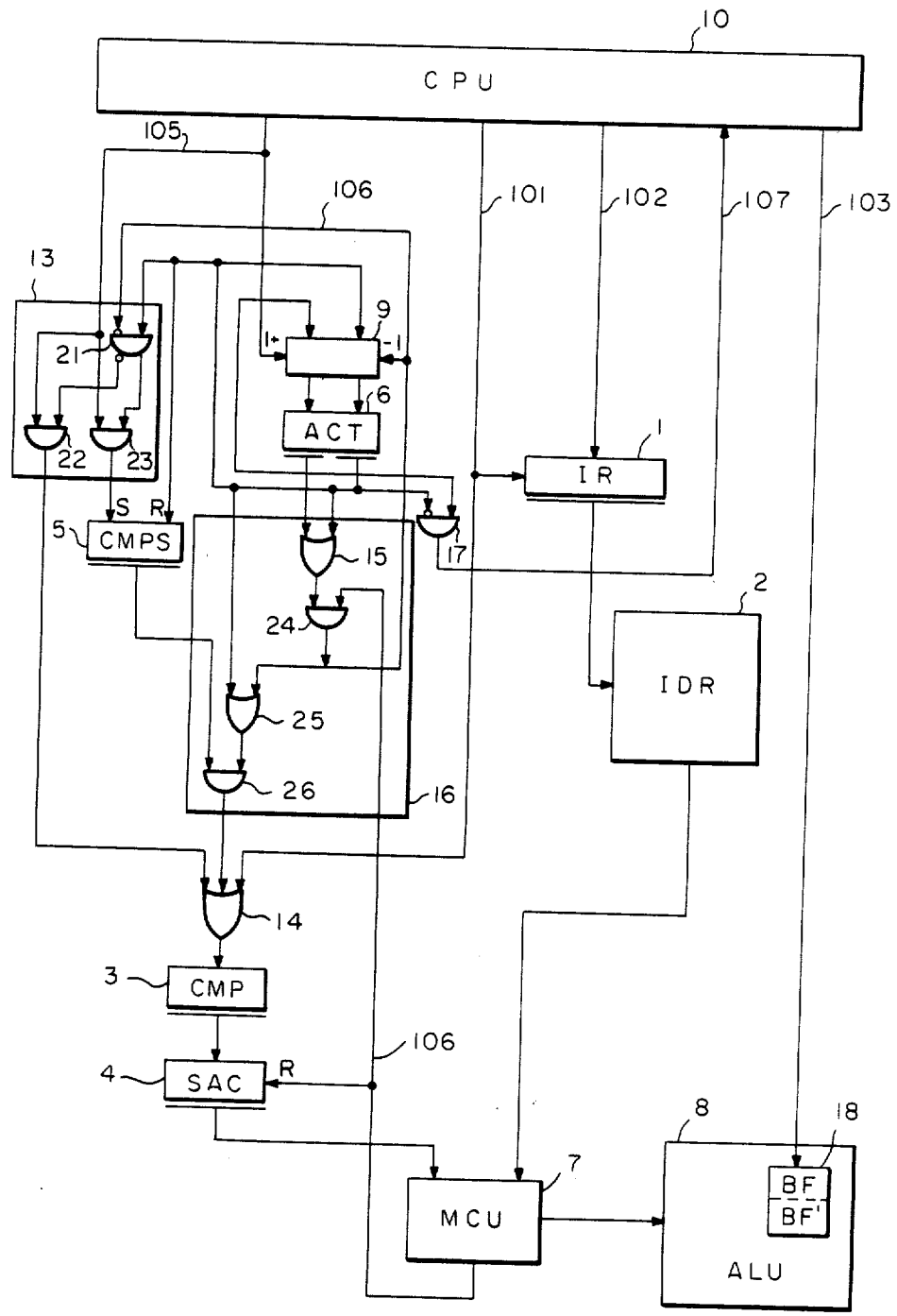
FIG. 7 illustrates a third embodiment of the invention.

Referring first to FIG. 7, the overall structure of the third embodiment of the invention is substantially the same as that of the second preferred embodiment. An operation completion detector circuit 16 in this third embodiment, which is an addition to the second embodiment, is intended to detect, upon completion of one operation, the decrease of the count of the ACT 6 in the next clock cycle.

Figure 8:
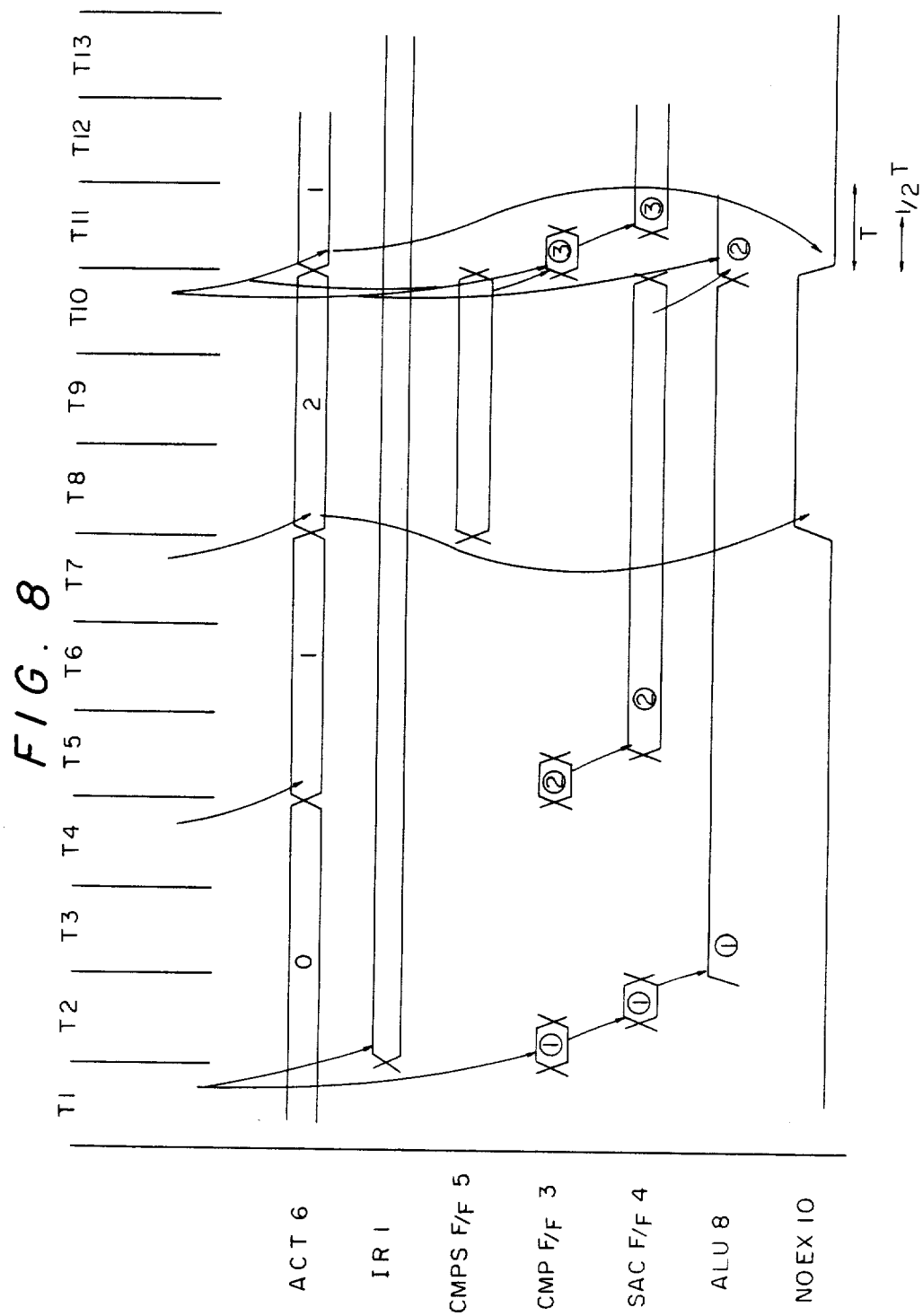
FIG. 8 illustrates the operation of the third embodiment of the invention.

Referring now to FIGS. 7 and 8 together, in response to the instruction load signal from the CPU 10, the instruction code 102 is loaded into the IR 1 at timing T1 and, at the same time, the CMP F/F 3 is set. The SAC F/F 4 is reset by the operation completion signal 106 and, immediately after that, set by the output of the CMP F/F 3 to let the vector processor start an operation. The operand 103 for use in this operation is supplied from the CPU 10. Since, at this time, the CPU 10 and the vector processor are executing the same instruction, the count of the ACT 6 is "0". As soon as the CPU completes giving an instruction concerning this operation to the vector processor, it moves ahead to the execution of the next operation. In a vector instruction, the next operation is assigned the same instruction code, so that no instruction is loaded for the vector processor, and instead the increase of the count of the ACT 6 in response to the operation start instruction signal 105 takes place at timing T5. Accordingly, the count of the ACT 6 changes to "1", and the CMP F/F 3 and the SAC F/F 4 are successively set at timing T5. The SAC F/F 4 remains in a set state unless the first operation 1 by the vector processor is already completed. In the meantime, however, the CPU 10 does supply the operand 103 for the second operation 2. and generates, in response to the completion of the operand loading for the second operation 2, the start instruction signal 105 for the third operation to increase the count of the ACT 6. As the vector processor has not yet completed the first operation by timing T7, the count of the ACT 6 becomes "2" and the CMPS F/F 5 is set at timing T8. In response to the count "2" of the ACT 6, an AND gate 17 generates the microprogram execution restraining signal 107 and sends it to the CPU 10. Responding to this signal 107, the CPU 10 restrains the execution of the microprogram. In the meantime, the completion microinstruction for the first operation 1 is executed in the MCU 7 of the vector processor, which completes its first operation 1 at timing T10. Since, at this timing T10, the SAC F/F 4 is in a set state, the execution of the second operation 2 is started at timing T11. At the beginning of timing T11, the execution completion signal 106 is generated from the MCU 7, and the SAC F/F 4 is reset. In response to this execution completion signal 106, the controller 9 reduces the count of the ACT 6, which then decreases to "1" to forbid the generation of the microprogram execution restraining signal 107, which has been generated by the AND gate 17. At timing T10, the CMPS F/F 5 is in a set state and the execution completion signal 106 is supplied, so that CMP F/F 3 is set by way of an AND gate 24, OR gate 25, AND gate 26 and the OR gate 14. In response to this setting, the SAC F/F 4 is set.

This preferred embodiment has a detector circuit 16 for detecting a decrease in the count of the ACT 6 in response to the completion of an operation by the vector processor, so that the CMP F/F 3 is set in the cycle next to the completion of the operation. This results in the advantage that the operand 103 can be immediately loaded in response to the cancellation of the microprogram execution restraining signal 107. Where there are two high-precision operands, loading of the operand 103 requires four clock (machine) cycles of the CPU 10. Accordingly, there is the advantage that, if the previous operation by the vector processor is complete by the completion of loading, the next operation can be started one clock (machine) cycle earlier than otherwise.

What is claimed is:

1. A processor which processes a sequential series of instructions, said processor comprising:

a central processing unit (CPU) processing an N-th instruction, where N represents a position of said N-th instruction in said sequential series of instructions;

indicator means, coupled to said CPU and responsive to an instruction load signal from said CPU, for generating a first signal when said indicator means is actuated, said first signal taking a first level when an instruction of said sequential series of instructions is stored into an instruction storage unit which is coupled to said CPU;

logical operation means, coupled to said CPU and to said indicator means and responsive to said first signal, for executing a vector operation in accordance with an M-th instruction, in parallel with execution in said CPU, where M represents a position of said M-th instruction in said sequential series of instructions;

counter means, coupled to said CPU and to said logical operation means, for indicating a difference between N and M at a given instant in time, said counter means storing a count value which increases in response to a processing start instruction from said CPU and decreases in response to completion of an operation by said logical operation means;

flag means, coupled to said CPU and to said indicator means and set in response to said processing start instruction from said CPU, for actuating said indicator means when said flag means is set; and decision means, coupled to said CPU, to said indicator means, to said counter means, and to said flag means, for determining, in accordance with an increase of said count value of said counter means to a prescribed count value in response to said processing start instruction from said CPU, whether or not execution by said CPU is restrained and, if execution is not restrained, actuating said indicator means in response to said processing start instruction from said CPU irregardless of whether said flag means is set.

2. A processor which processes a sequential series of instructions, said processor comprising:

a CPU processing an N-th instruction, where N represents a position of said N-th instruction in said sequential series of instructions;

indicator means, coupled to said CPU and responsive to an instruction load signal from said CPU, for generating a first signal when said indicator means is actuated, said first signal taking a first level when an instruction of said sequential series of instructions is stored into an instruction storage unit which is coupled to said CPU;

logical operation means, coupled to said CPU and to said indicator means and responsive to said first signal, for executing an operation in accordance with M-th instruction, in parallel with execution in said CPU, where M represents a position of said M-th instruction in said sequential series of instructions;

counter means, coupled to said CPU and to said logical operation means, for indicating a difference between N and M at a given instant in time, said counter means storing a count value which increases in response to a processing start instruction from said CPU and decreases in response to completion of an operation by said logical operation means;

execution restraining signal generator means, coupled to said CPU and to said counter means and responsive to a prescribed count value of said counter means, for generating a restraining signal for restraining execution of instructions from said sequential series of instructions by said CPU and for transmitting said restraining signal to said CPU;

flag means, coupled to said CPU and to said indicator means, and set in response to said processing start instruction from said CPU, for actuating said indicator means when said flag means is set; and detector means, coupled to said indicator means, to said logical operation means, to said counter means, and to said flag means, for detecting, when said flag means is in a set state and said restraining signal has been generated from said execution restraining signal generator means, that a count value of said counter means has decreased wherein generation of said restraining signal from said execution restraining signal generator means is thereafter prevented and for activating said indicator means at a next clock cycle in response to completion of operation of said logical operation means.

3. A processor which processes a sequential series of instructions, said processor comprising:

a CPU processing an N-th instruction, where N represents a position of said N-th instruction in said sequential series of instructions;

indicator means, coupled to said CPU and responsive to an instruction load signal from said CPU, for generating a first signal when said indicator means is actuated, said first signal taking a first level when an instruction of said sequential series of instructions is stored into an instruction storage unit which is coupled to said CPU;

logical operation means, coupled to said CPU, for executing an operation in accordance with an M-th instruction, in parallel with execution in said CPU, where M represents a position of said M-th instruction in said sequential series of instructions;

counter means, coupled to said CPU and to said logical operation means, for indicating a difference between N and M at a given instant in time, said counter means storing a counter value which increases in response to a processing start instruction from said CPU and decreases in response to completion of an operation by said logical operation means;

execution restraining signal generator means, coupled to said CPU and to said counter means and responsive to a prescribed count value of said counter means, for generating a restraining signal for restraining execution of instructions from said sequential series of instructions by said CPU and for transmitting said restraining signal to said CPU;

flag means, coupled to said CPU and to said indicator means and set in response to said processing start instruction from said CPU, for actuating said indicator means when said flag means is set;

decision means, coupled to said CPU, to said indicator means, to said counter means, and to said flag means, for determining, in accordance with an increase of said count value of said counter means to said prescribed count value in response to said processing start instruction from said CPU, whether or not said execution by CPU is restrained and, if execution is not restrained, actuating said indicator means in response to said processing start instruction from said CPU irregardless of whether said flag means is set;

start instruction means, coupled to said indicator means and to said logical operation means and responsive to said first signal, for starting processing by said logical operation means; and detector means, coupled to said indicator means, to said logical operation means, to said counter means, and to said flag means, for detecting, when said flag means is in a set state and said restraining signal has been generated from said execution restraining signal generator means, that a count value of said counter means has decreased, wherein generation of said restraining signal from said execution restraining signal generator means is thereafter prevented and for actuating said indicator means at a next clock cycle in response to completion of operation of said logical operation means.

4. A processor which processes a sequential series of instructions, said processor comprising:

a CPU processing an N-th instruction, where N represents a position of said N-th instruction in said sequential series of instructions;

indicator means, coupled to said CPU and responsive to an instruction load signal from said CPU, for generating a first signal when said indicator means is actuated, said first signal taking a first level when an instruction of said sequential series of instructions is stored into an instruction storage unit which is coupled to said CPU;

logical operation means, coupled to said CPU, for executing an operation in accordance with an M-th instruction, in parallel with execution in said CPU, where M represents a position of said M-th instruction in said sequential series of instructions;

counter means, coupled to said CPU and to said logical operation means, for indicating a difference between N and M at a given instant in time, said counter means storing a count value which increases in response to a processing start instruction from said CPU and decreases in response to completion of an operation by said logical operation means;

execution restraining signal generator means, coupled to said CPU and to said counter means and responsive to a prescribed count value of said counter means, for generating a restraining signal for restraining execution of instructions from said sequential series of instructions by said CPU and for transmitting said restraining signal to said CPU;

flag means, coupled to said CPU and to said indicator means and set in response to said processing start instruction from said CPU, for actuating said indicator means when said flag means is set;

decision means, coupled to said CPU, to said indicator means, to said counter means, and to said flag means, for determining, in accordance with an increase of said count value of said counter means to said prescribed count value in response to said processing start instruction from said CPU, whether or not execution by said CPU is restrained and, if execution is not restrained, actuating said indicator means in response to said processing start instruction from said CPU irregardless of whether said flag means is set; and start instruction means, coupled to said indicator means and to said logical operation means and responsive to said first signal, for starting processing by said logical operation means.

5. A processor which processes a sequential series of instructions, said processor comprising:

a CPU processing an N-th instruction, where N represents a position of said N-th instruction in said sequential series of instructions;

indicator means, coupled to said CPU and responsive to an instruction load signal from said CPU, for generating a first signal when said indicator means is actuated, said first signal taking a first level when an instruction of said sequential series of instructions is stored into an instruction storage unit which is coupled to said CPU;

logical operation means, coupled to said CPU, for executing an operation in accordance with an M-th instruction, in parallel with execution in said CPU, where M represents a position of said M-th instruction in said sequential series of instructions;

counter means, coupled to said CPU and to said logical operation means, for indicating a difference between N and M at a given instant in time, said counter means storing a count value which increases in response to a processing start instruction from said CPU and decreases in response to completion of an operation by said logical operation means;

execution restraining signal generator means, coupled to said CPU and to said counter means and responsive to a prescribed count value of said counter means, for generating a restraining signal for restraining execution of instructions from said sequential series of instructions by said CPU and for transmitting said restraining signal to said CPU;

flag means, coupled to said CPU and to said indicator means and set in response to said processing start instruction from said CPU, for actuating said indicator means when said flag means is set;

start instruction means, coupled to said indicator means and to said logical operation means and responsive to said first signal, for starting processing by said logical operation means; and detector means, coupled to said indicator means, to said logical operation means, to said counter means, and to said flag means, for detecting, when said flag means is in a set state and said restraining signal has been generated from said execution restraining signal generator means, that a count value of said counter means has decreased, wherein generation of said restraining signal from said execution restraining signal generator means is thereafter prevented and for actuating indicator means is actuated at a next clock cycle in a response to completion of operation by said logical operation means.

* * * * *